US012756669B2

(12) United States Patent
Balasubramanian et al.

(10) Patent No.: US 12,756,669 B2
(45) Date of Patent: Oct. 6, 2026

(54) FLOW PRIORITIZATION

(71) Applicant: Apple Inc., Cupertino, CA (US)

(72) Inventors: Srinivasan Balasubramanian, San Diego, CA (US); Vijay Venkataraman, San Jose, CA (US); Srirang A Lovlekar, Fremont, CA (US); Sreevalsan Vallath, Dublin, CA (US)

(73) Assignee: Apple Inc., Cupertino, CA (US)

( * ) Notice: Subject to any disclaimer, the term of this patent is extended or adjusted under 35 U.S.C. 154(b) by 91 days.

(21) Appl. No.: 18/476,781

(22) Filed: Sep. 28, 2023

(65) Prior Publication Data

US 2025/0112869 A1 Apr. 3, 2025

(51) Int. Cl.

| | |
|---|---|
| ***H04L 47/32*** | (2022.01) |
| ***H04L 47/24*** | (2022.01) |
| ***H04L 47/6275*** | (2022.01) |

(52) U.S. Cl.

CPC ............ *H04L 47/323* (2013.01); *H04L 47/24* (2013.01); *H04L 47/6275* (2013.01)

(58) Field of Classification Search

CPC .... H04L 47/323; H04L 47/24; H04L 47/6275
USPC .......................................................... 709/238
See application file for complete search history.

(56) References Cited

U.S. PATENT DOCUMENTS

| | | | | |
|---|---|---|---|---|
| 6,215,769 B1 | | 4/2001 | Ghani et al. | |
| 8,437,284 B2 | | 5/2013 | Plamondon et al. | |
| 10,021,688 B2 | | 7/2018 | Xie | |
| 2002/0141403 A1 | * | 10/2002 | Akahane | H04L 45/302 370/389 |
| 2006/0165029 A1 | * | 7/2006 | Melpignano | H04L 47/2416 370/328 |
| 2013/0208585 A1 | | 8/2013 | Jonsson et al. | |
| 2015/0255053 A1 | * | 9/2015 | Nelson | G10H 1/0083 84/645 |
| 2016/0278072 A1 | * | 9/2016 | Palle | H04W 72/542 |
| 2016/0338077 A1 | * | 11/2016 | Chin | H04W 72/1215 |
| 2017/0223626 A1 | * | 8/2017 | Zhuang | H04W 48/20 |
| 2018/0048577 A1 | * | 2/2018 | Gulati | H04L 47/12 |
| 2019/0140952 A1 | * | 5/2019 | Torres | H04L 47/10 |
| 2021/0007055 A1 | * | 1/2021 | Luna | G06F 16/9574 |
| 2021/0329658 A1 | * | 10/2021 | Li | H04W 72/23 |
| 2021/0409335 A1 | | 12/2021 | Zhu et al. | |
| 2022/0166705 A1 | | 5/2022 | Froese | |
| 2023/0067851 A1 | * | 3/2023 | Zeng | H04W 28/0268 |
| 2023/0141262 A1 | * | 5/2023 | Huang | H04L 5/0064 370/336 |

OTHER PUBLICATIONS

Nokia Bell Labs; Low Latency, Low Loss, and Scalable Throughput (L4S) Internet Service: Architecture; ISSN: 2070-1721; Jan. 2023.

* cited by examiner

*Primary Examiner* — Jeffrey R Swearingen
(74) *Attorney, Agent, or Firm* — Eschweiler & Potashnik, LLC; Ningjiao Zhang

(57) ABSTRACT

Systems, methods, devices, and circuitries are provided for downlink flow control. In one example, a method for a user equipment (UE) includes determining respective priorities of uplink (UL) feedback packets based on a respective UE-assigned priority of an application or data flow with which the respective UL feedback packet is associated; and selectively transmitting the respective UL feedback packets based on the respective UE-assigned priorities.

25 Claims, 9 Drawing Sheets

FLOW PRIORITIZATION

BACKGROUND

The present disclosure relates generally to wireless communication and more specifically to techniques that may be used by a user equipment (UE) to avoid congestion for higher priority uplink (UL) application traffic packet flows.

BRIEF DESCRIPTION OF THE DRAWINGS

Some examples of circuits, apparatuses and/or methods will be described in the following by way of example only. In this context, reference will be made to the accompanying figures.

DETAILED DESCRIPTION

Figure 1:
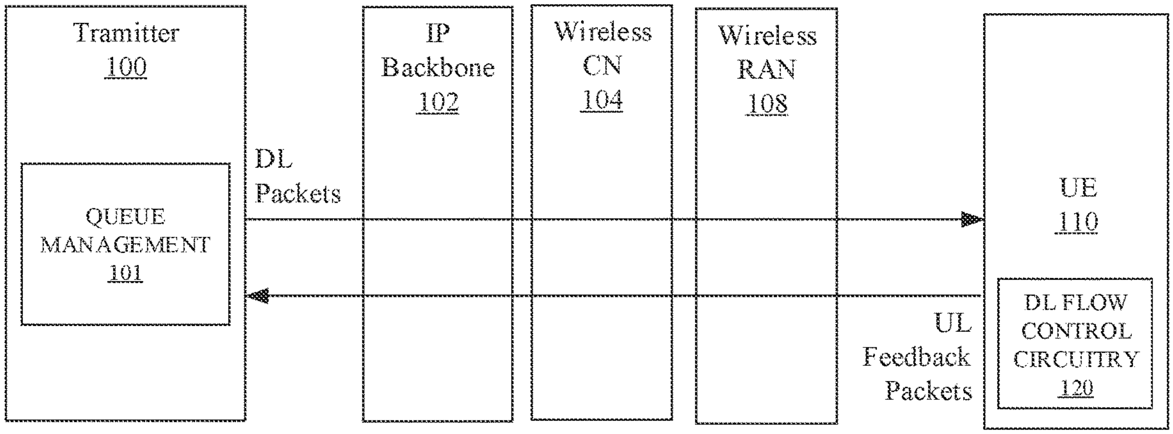
FIG. 1 is a diagram of a communication network in which downlink (DL) packets are transmitted to a UE and, in response, the UE transmits uplink (UL) feedback packets, in accordance with various aspects described.

The present disclosure is described with reference to the attached figures. Similar components in various figures are represented by similar reference characters. The figures are not drawn to scale and they are provided merely to illustrate the disclosure. Several aspects of the disclosure are described below with reference to example applications for illustration. Numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the selected present disclosure.

The optimization of wireless communication relies on making a maximum use of available bandwidth while avoiding packet overload at either the transmitter or receiver in changing network conditions. FIG. 1 illustrates a communication system including a UE 110 and a transmitter 100. The transmitter 100 may be device that hosts an application server. Application-related DL packets transmitted by the transmitter 100 through an internet protocol (IP) backbone 102 and a wireless core network (CN) 104 to a wireless radio area network (RAN) 108 that includes a WiFi or local area network (LAN) access point (AP) such as a router or a radio access network (RAN) node associated with a cellular network to which the UE 110 is connected. The transmitter 100 may transmit DL packets associated with multiple applications in use by the UE (e.g., video calling, streaming, gaming, navigation, and so on). The UE 110 may transmit UL feedback packets to the transmitter that acknowledge or otherwise respond to the DL packets.

Each UL feedback packet is associated with a specific DL packet. UL feedback packets include acknowledgement (ACK) packets that confirm receipt of one or more DL packets. The term ACK packet is a general term that as used herein may refer to packets that include indication of one or more of ACK, non-acknowledgement (NACK), duplicate ACK, selective ACK, piggybacked ACK, and so on. UL feedback packets may also include handshaking related (HS) packets in which the UE is exchanging connection or capability related information with the transmitter with the aim of establishing a new flow of packets, which may be associated with an application or feature not yet in use by the UE. Thus, in general, UL feedback packets in some way acknowledge or respond to a particular DL packet. UL feedback packets are thus different from other UL packets that are initiated by applications at the UE side and are not transmitted to acknowledge receipt or loss of a DL packet, such as an SMS message. These packets are referred to herein as UL application traffic packets in contrast to UL feedback packets.

The transmitter 100 includes a queue management function 101 that controls a rate at which packets for various flows are transmitted to the UE 110 to maximize use of existing bandwidth and support quality of service (QOS) requirements. The queue management function 101 controls the DL packet transmission rate to avoid overwhelming the UE with packets, which may cause the UE to drop some packets and necessitate retransmission of packets. In general, the queue management function 101 controls the rate of transmission for each flow based on a rate at which UL feedback packets for that flow are received. In some aspects, the queue management function 101 uses a round trip time (RTT) to determine a level of congestion associated with the flow and may adjust the rate of transmission of DL packets based on the RTT. In some aspects, to communicate latency and congestion related information to the transmitter, UL application traffic packets may include indications of congestion such as explicit congestion notification (ECN) tags, differentiated services code point (DSCP) tags, time-to-live indication, and so on.

The transmitter measures the RTT for DL packets based on a time that elapses between the time a DL packet is sent and the corresponding UL feedback packet is received from the UE. Thus, in general terms, a UL feedback packet may be any packet that may be used by the transmitter to determine a RTT with respect to the UE. For example, when a DL packet includes DL data transport blocks, the transmitter will calculate the RTT based on the time at which the packet carrying the DL data transport blocks was transmitted and a time at which a UL ACK packet for the transport blocks is received. In other examples, the queue management function 101 may use a different timing related metric that is calculated based on arrival time or other characteristic of UL feedback packets to control the transmission rate of DL packets. The disclosed techniques also apply in these scenarios.

Queue management functions that are based on a round-trip time or other timing metric for UL feedback packets provide dynamic adjustment of transmission rates based on UE congestion levels. However, such queue management functions may take several iterations of DL packet/UL feedback packet exchange to adjust to a temporary drastic change in bandwidth caused by a handover or connection re-establishment, or the dropping of high capacity links. A transmit window and corresponding transmit buffer may be established for a flow based on prior DL traffic and corresponding UL feedback. A change in bandwidth may then result in a collapse of the transmit window such that the transmitter may also unnecessarily re-transmit packets which were received by the UE but in which the ACK is taking longer than can be handled by the transmit buffer.

If a high priority application is running on the UE that generates bursty UL application traffic packets, the existing DL packet transmission rates may not allow the UE to quickly transmit a burst of UL application traffic packets due to UE congestion caused by the DL packets associated with lower priority applications. This may increase the latency of the UL application traffic packets for the high priority application. In other words, the UE does not have a mechanism by which the UE itself may control DL flows on a per application basis to free up UE capacity for a higher priority UL flow that is being constrained by lower priority flows.

Techniques involving the tagging of UL application traffic packets with congestion/latency related information such as an ECN tag to signal that a node is experiencing congestion have been proposed. However, these techniques require that all nodes that handle the packet interpret and act on the ECN flag to reduce congestion at the flagging node. Further, in flows that have asymmetric traffic in terms of UL and DL (e.g., web download), there may not be sufficient UL application traffic packets to carry tags and regulate DL traffic. Described herein are systems, methods, and circuitries that provide a mechanism for UE side control of the transmission rate of DL packets. The disclosed techniques do not rely on explicitly signaling congestion to the network. This allows the UE to internally prioritize certain UL traffic without need for interacting with the network to provide congestion notifications.

The UE 110 includes DL flow control circuitry 120 that controls an order and feedback rate at which UL feedback packets are transmitted to indirectly control the rate of DL packets for different flows. The DL flow control circuitry 120 reduces the feedback rate at which UL feedback packets that communicate ACK for data flows associated with lower priority applications are transmitted to cause the queue management function 101 to observe a higher RTT for lower priority data flows. This causes the queue management function 101 to reduce the transmission rate for the lower priority data flows, freeing up UE capacity for processing packets associated with higher priority data flows. UL feedback packets that include HS information for lower priority applications may also be transmitted at a lower feedback rate to slow the process at which data flows for the lower priority applications are instantiated on the UE to maintain UE capacity for higher priority UL application traffic packets. The delayed transmission and/or dropping of UL feedback packets (including ACK and, optionally, HS packets) by the DL flow control circuitry 120 may be referred to herein as "throttling" UL feedback packets or reducing a feedback rate for the UL feedback packets.

When the UL feedback packets for lower priority data flows are throttled, the UL feedback packets for the higher priority data flows may be sent at a faster feedback rate, which will cause the transmission rate of the DL packets for the higher priority applications to be increased by the queue management function 101. In other words, the DL flow control circuitry 120 adjusts the feedback rate at which UL feedback packets for different applications are transmitted to cause the queue management function 101 to reduce the transmission rate of DL packets associated with lower priority applications and/or increase the transmission rate of DL packets associated with higher priority applications.

DL flow control circuitry 120 and any other circuitry disclosed herein may, in some examples, include hardware, such as accelerators, and/or memory storing instructions for performing various described functions and one or more processors (e.g., an application processor, a baseband processor, and/or other processors of the UE) that execute the stored instructions to perform the functions.

Figure 2:
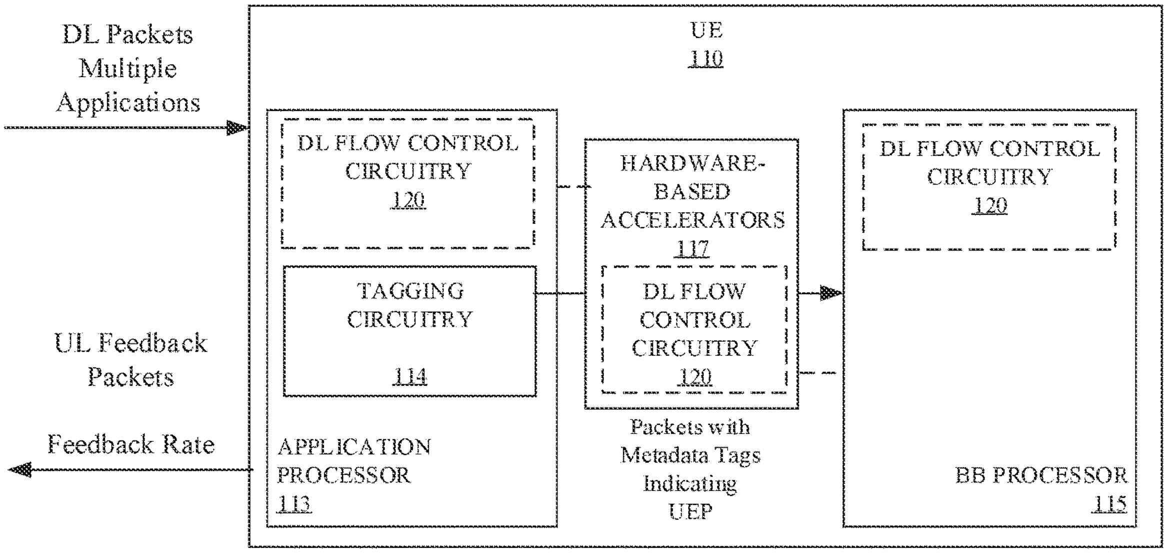
FIG. 2 is a diagram an example UE having an application processor that tags packets with an indication of a UE based priority, in accordance with various aspects described.

FIG. 2 is a functional block diagram of an example UE 110 that includes an application processor 113, a baseband processor 115, and hardware-based accelerators 117 that may be integrated with either the application processor 113, the baseband processor 115, or another processor (not shown). The application processor 113 includes tagging circuitry 114 that performs a tagging function with respect to packets (e.g., including UL feedback packets and UL application traffic packets) that are provided to the baseband processor 115 for transmitting. The tagging circuitry 114 applies a metadata tag (e.g., by way of a header field) that indicates a priority of the data flow or application associated with the packet, and, optionally, one or more of an ECN tag, a quality of experience metric of the application such as a mean opinion score, and a QoS performance metric such as delay, throughput, jitter, packet error rate, and so on.

The priority indicated by the metadata tag may be an internal priority assigned by the UE with respect to other active applications or data flows and may be independent of a priority assigned to the application by the network and used by the queue management function. This priority that is assigned by the UE and used by the DL flow control circuitry is referred to herein as UE-assigned priority (UEP) or UEPX, with X representing the priority value. In some examples, the UE may assign a priority of UEP1-UEPN to an application or data flow based on a ranking of N active applications or data flows. In other examples, the UE may assign a "high" priority to a highest priority application data flow and a low priority to all other active applications or data flows.

In some examples, the UEP is indicated by the metadata tag and in other examples, the metadata tag indicates another aspect of the packet (e.g., the originating application or traffic class) and a mapping table of UEP to the indicated aspect is maintained by the UE for access by DL flow control circuitry 120 in determining a UEP of UL feedback packets. The metadata tag and/or UEP may also be used by the UE for other purposes in addition to DL flow control. The UE based prioritization of applications or data flows may change dynamically in which case the UEP value assigned to UL feedback packets for applications will change accordingly.

The DL flow control circuitry 120 selectively transmits UL feedback packets in an order and at a feedback rate that is based on the UEP value indicated in the packets. "Selectively" transmitting means that the UE may not transmit all of the UL feedback packets as some of the packets may be dropped as will be described in more detail below. As indicated by the dashed lines in FIG. 2, some or all of the functions of the DL flow control circuitry 120 may be performed by the application processor 113 or the baseband processor 115 executing stored instructions, or hardware, such as hardware-based accelerators 117 that transition packets between the application processor 113 and the baseband processor 115.

Figure 3:
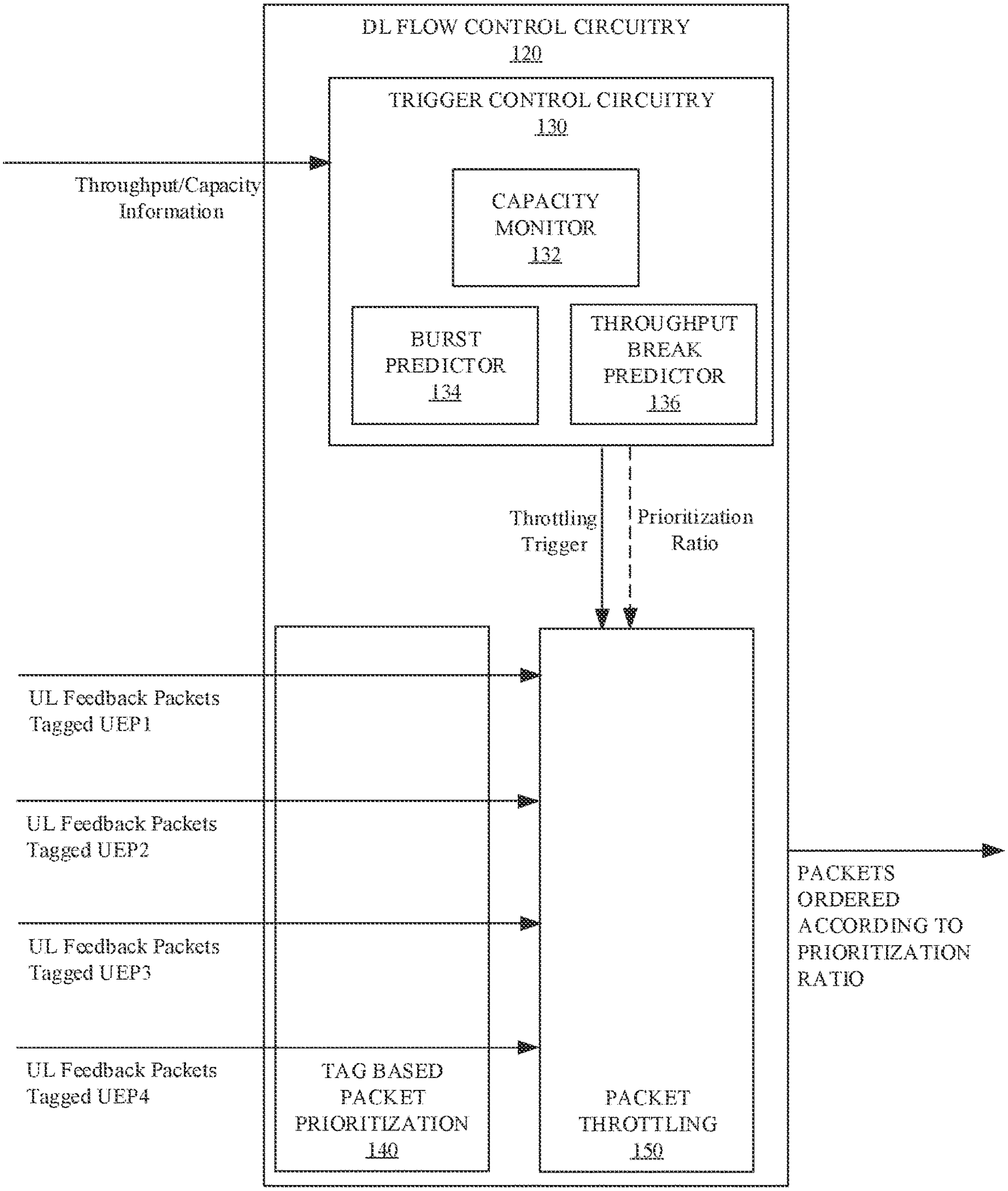
FIG. 3 is a functional block diagram of example DL flow prioritization circuitry that selectively transmits UL feedback packets to control a rate at which DL packets are transmitted, in accordance with various aspects described.

FIG. 3 is a functional block diagram of an example DL flow control circuitry 120 that includes trigger control circuitry 130, tag based packet prioritization circuitry 140, and packet throttling circuitry 150. DL flow control circuitry 120 receives or monitors UE throughput and/or capacity. This may be performed by monitoring physical resource block (PRB) utilization, UE level throughput assessed at L2/L3 layers, a difference between measured QoS metrics and targets, and so on. It is noted that the UE's capacity may be affected by external conditions such as the UE relinquishing capacity to an even higher priority application.

The DL flow control circuitry 120 receives tagged UL feedback packets (e.g., UL feedback packets marked UEP1 (highest priority) through UEP4 (lowest priority) as shown in FIGS. 3-7). The DL flow control circuitry 120 selectively transmits the UL feedback packets based on a UEP value indicated by the UEP tag on the packets. Tag based packet prioritization circuitry 140 orders UL feedback packets for transmission based on the UEP value indicated by the tag.

Packet throttling circuitry 150 controls a rate at which the ordered UL feedback packets are transmitted based on the UEP value indicated by the UEP tag on the packets and a prioritization ratio. Packet throttling circuitry 150 may reduce the rate of transmission of certain UL feedback packets by holding the packets in a buffer for a certain delay period and/or increasing a number of higher priority UL feedback packets that are transmitted for each lower priority UL feedback packet. The trigger control circuitry 130 triggers the packet throttling circuitry 150 to throttle lower priority packets during certain time intervals. In some examples, the packet throttling circuitry 150 is implemented in an iOS or Linux layer or another layer above the packet data convergence protocol (PDCP) layer.

Figure 4:
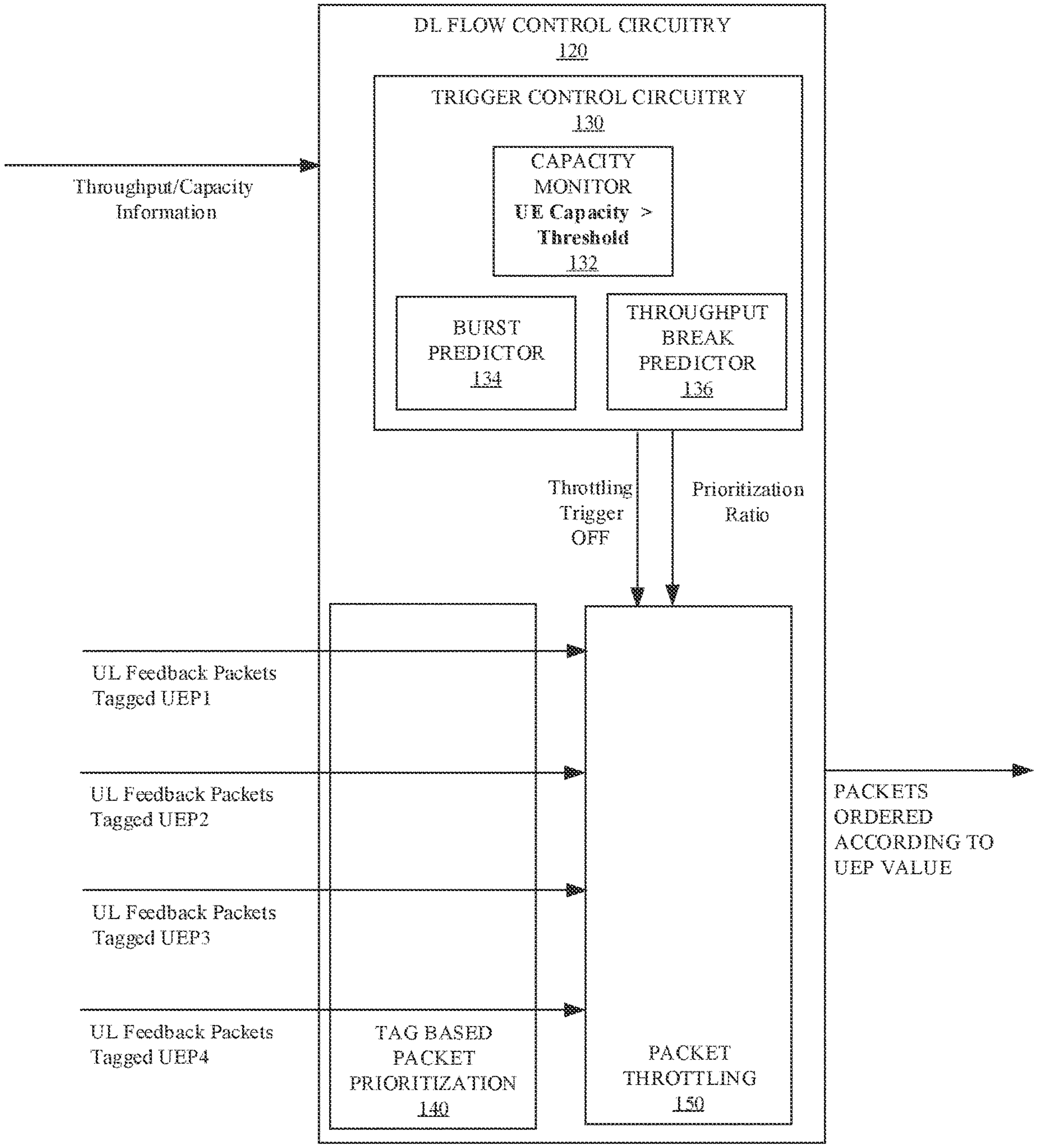
FIG. 4 is a functional block diagram of example DL flow prioritization circuitry that selectively transmits UL feedback packets to control a rate at which DL packets are transmitted, in accordance with various aspects described.

FIG. 4 illustrates a UE use case scenario in which the UE has sufficient capacity to support the transmission of UL application traffic packets related to the highest priority application (UEP1) without congestion. In some examples, capacity monitor circuitry 132 determines that the UE has sufficient capacity for a higher priority application when the UE available capacity is above a threshold determined based on the capacity required for the higher priority application. In one example, the threshold is 115% of the capacity required by the higher priority application. The capacity requirement of an application may be determined based on negotiated QoS parameters, a capacity required by the application in past usage, or crowd-sourced application capacity requirements that may be based on time of day, day of week, location of the device, and so on. When the UE has sufficient capacity, the UE is able to handle the current rate of DL transmissions, and the ordering of packets based on UEP value performed may be sufficient to allow the UE to manage the rate of DL packets to facilitate traffic for higher priority applications as compared to lower priority applications. Thus, in the example of FIG. 4, the trigger control circuitry 130 does not trigger the packet throttling circuitry 150 and all UL feedback packets may be transmitted, without delay, as ordered according to UEP value by the tag based packet prioritization circuitry 140.

Figure 5:
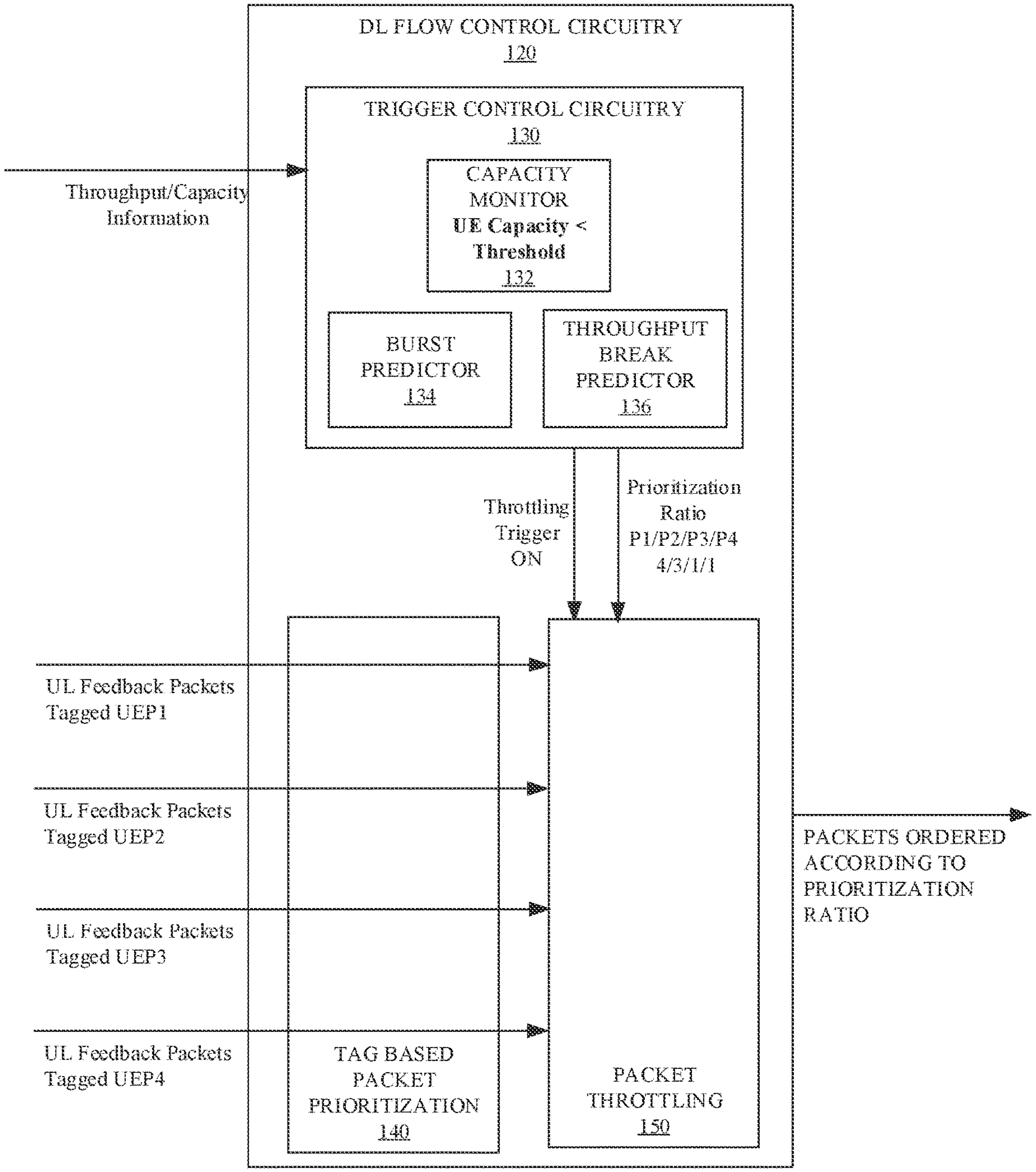
FIG. 5 is a functional block diagram of example DL flow prioritization circuitry that selectively transmits UL feedback packets to control a rate at which DL packets are transmitted, in accordance with various aspects described.

FIG. 5 illustrates a UE use case scenario in which UE does not have sufficient capacity to support the transmission of UL application traffic packets related to the highest priority application (UEP1) without congestion. The capacity monitor circuitry 132 determines that the UE capacity is less than the threshold (e.g., 115% of application capacity requirement). In response, the trigger control circuitry 130 triggers the packet throttling circuitry 150 to throttle lower priority UL feedback packets. In some examples, the throttling of lower priority UL feedback packets is performed based on a time delay during which lower priority packets are buffered as compared to highest priority packets which are not so delayed.

Some of the illustrated examples characterize one application as having a highest UEP with the remaining applications having the same lower UEP such that UL feedback packets of the highest priority application are not delayed or throttled and UL feedback packets of the lower priority applications are delayed for the same delay duration or throttled at the same rate. Use of a prioritization ratio allows for UL feedback packets for all applications to be assigned a relative priority with respect to one another. As shown in FIG. 5, the trigger control circuitry 130 provides a prioritization ratio to the packet throttling circuitry 150. The prioritization ratio defines a ratio according to which UL feedback packets for different applications are transmitted. In FIG. 5, the prioritization ratio is 4/3/1/1 for UEP1, UEP2, UEP3, UEP4, respectively.

There are different ways in which UL feedback packets for the different applications may be ordered and/or delayed based on the prioritization ratio. In some examples, the prioritization ratio controls a relative delay that is imposed on the lower priority applications with respect to the higher priority applications (e.g., no delay for UEP1, x delay for UEP2, and 3x delay for UEP3 and UEP 4 UL feedback packets). In some examples, the ordered UL feedback packets received from the tag based packet prioritization circuitry 140 are transmitted such that at most (or least) four UEP1 packets and three UEP2 packets are transmitted for each UEP3 and UEP4 packet. In some examples, a UL feedback packet is queued for each application and, if remaining capacity for UL feedback packets (e.g., based on expected prioritization of the DL flow and the available UL capacity of the UE) is available, UL feedback packets for higher priority applications are queued to occupy remaining capacity. Throttling of UL feedback packets may be performed until the UE capacity exceeds the threshold, at which time the trigger control circuitry 130 may disable the throttling trigger.

In some examples, prioritization ratio is determined based on a level of congestion of the UE, the size of unmet capacity demands of the higher priority application, and/or a measured throughput delay of high priority packets. The trigger control circuitry 130 may assign a higher prioritization ratio for UEP1 when there is a high level of congestion, a large quantity of unmet UEP1 capacity demand, or a longer delay for UEP1 packets. The prioritization ratio may be changed dynamically as the UE's capacity for UL traffic increases and decreases, so that increased UL capacity does not go unused by continuing to throttle lower priority UL feedback packets at a current level.

While the example of FIG. 5 illustrates a dynamic approach to triggering UL feedback packet throttling in response to reduced UE capacity, in other examples, packet throttling is used regardless of the UE's current capacity.

Figure 6:
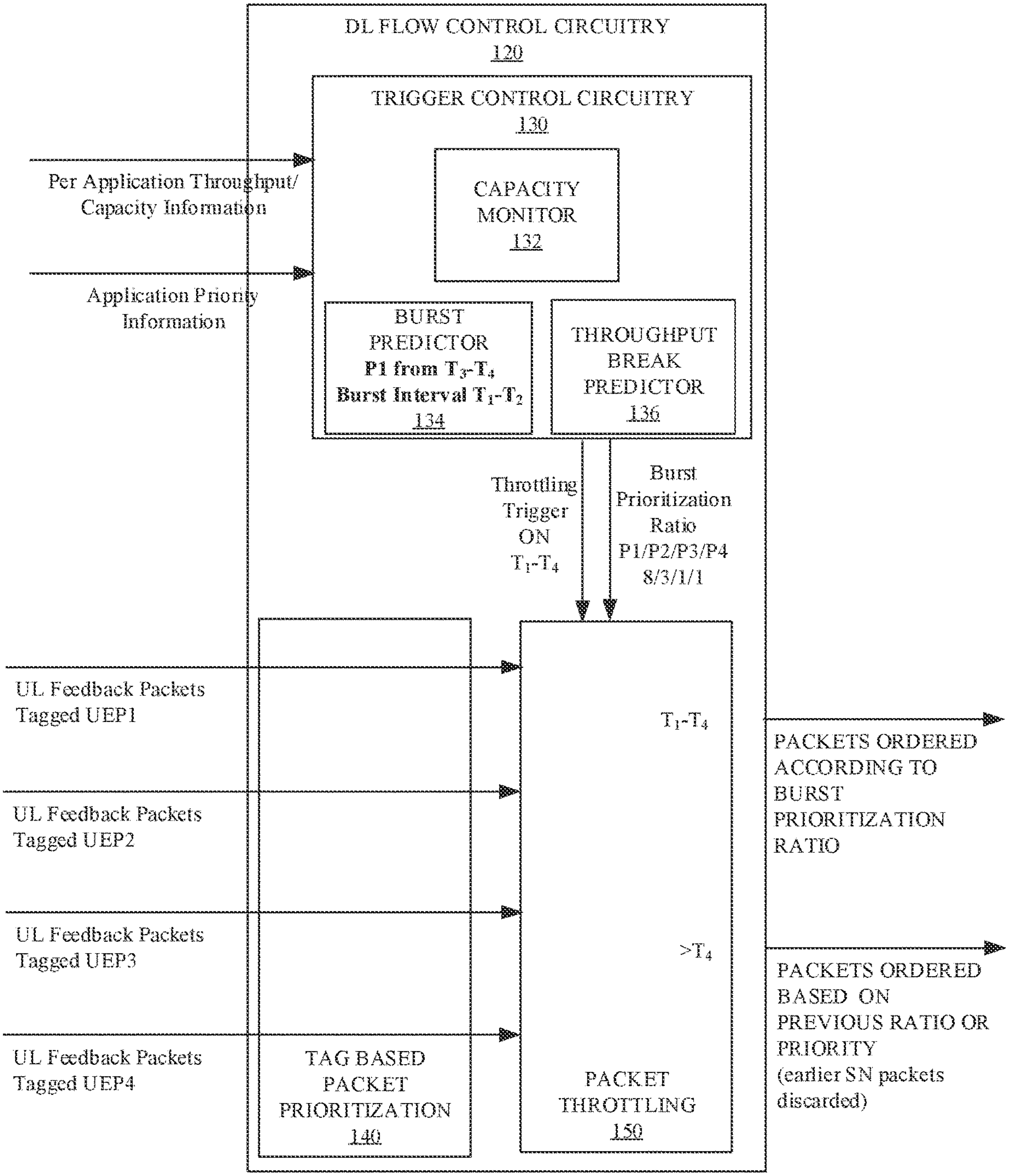
FIG. 6 is a functional block diagram of example DL flow prioritization circuitry that selectively transmits UL feedback packets to control a rate at which DL packets are transmitted prior to a burst of UL application traffic packets, in accordance with various aspects described.

FIG. 6 illustrates a UE use case in which the high priority application UEP1 transmits UL application traffic packets in bursts. Burst predictor circuitry 134 may determine that a burst of UL application traffic packets with UEP1, such as a sequence of images triggered by a security-related application, will be transmitted by the UE during a burst interval $T_3$-$T_4$. The burst predictor circuitry 134 may predict bursts, for example, based on control signaling associated with UL bursts. In some examples, the capacity monitor circuitry 132 determines whether the UE has sufficient capacity to handle the burst (e.g., the buffer has capacity for 115% of the predicted burst packets). If the UE does not have sufficient capacity for the burst, the trigger control circuitry 130 triggers the packet throttling circuitry 150 to throttle packets according to a burst-related prioritization ratio during a pre-burst interval $T_1$-$T_2$ and, optionally, continuing through the burst interval $T_3$-$T_4$.

The burst-related prioritization ratio for UEP1 may be different than a prioritization ratio used in other scenarios (e.g., P1 is increased to 8 as in FIG. 6 from 4 as in FIG. 5). The duration of the pre-burst interval may be determined by the burst predictor circuitry 134 based on a size of the predicted burst and the current capacity of the UE.

In some examples, the throttling to accommodate UL bursts is performed irrespective of the UE's current capacity, an in response to a predicted burst of high priority UL application traffic packets, the trigger control circuitry 130 triggers the packet throttling circuitry 150 to throttle packets according to the burst-related prioritization ratio during the pre-burst interval $T_1$-$T_2$ and, optionally, continuing through the burst interval $T_3$-$T_4$, as shown in FIG. 6.

After the burst interval, the trigger control circuitry 130 disables the throttling trigger or resumes throttling according to a prioritization ratio that was in use prior to the burst. In some examples, after the burst interval, the packet throttling circuitry 150 may drop buffered UL feedback packets having lowest sequence number and transmit UL feedback packets having the highest sequence number for each application. The UL feedback packets with the highest sequence numbers may serve as an ACK for DL packets with lower sequence numbers.

Figure 7:
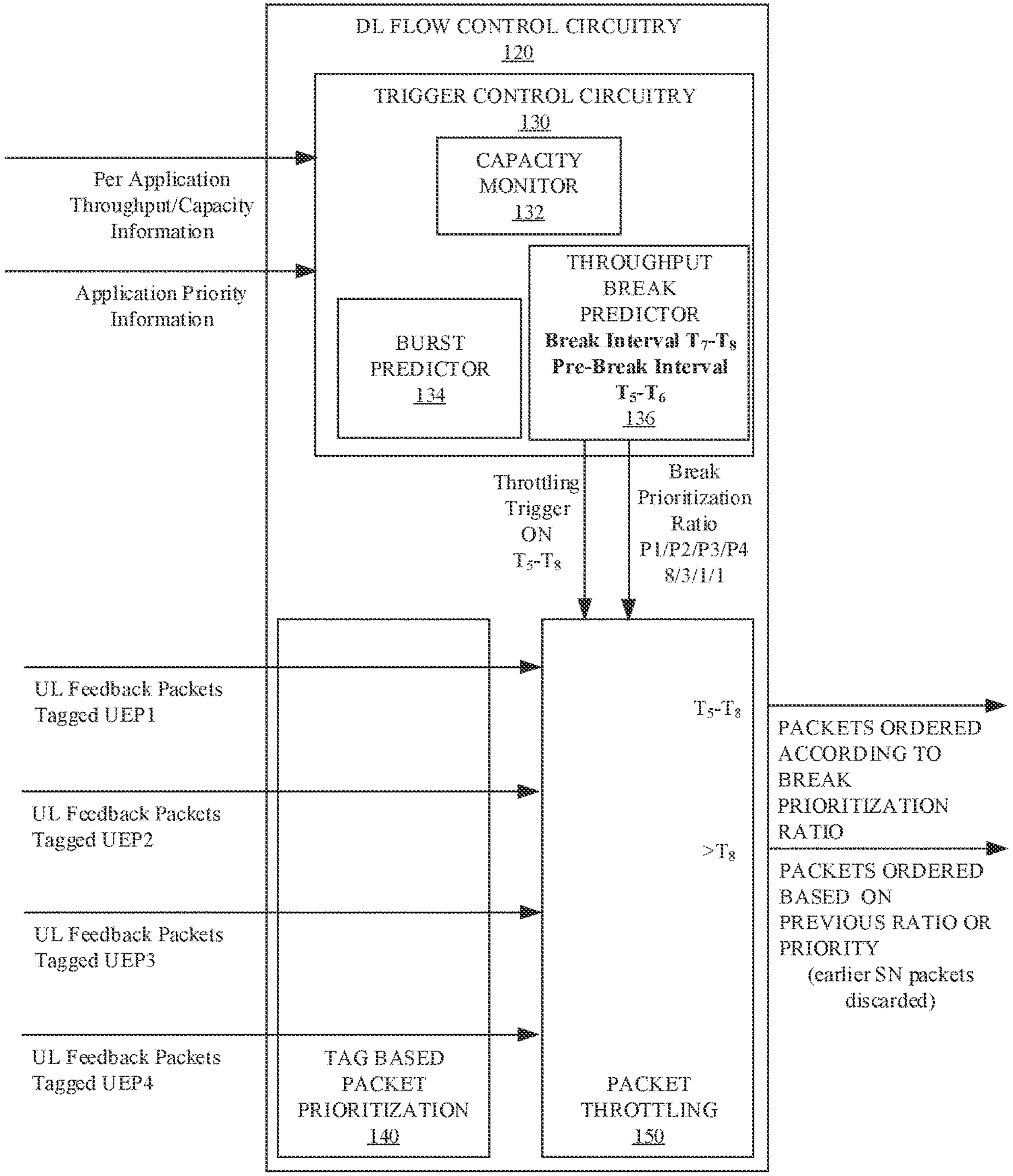
FIG. 7 is a functional block diagram of example DL flow prioritization circuitry that selectively transmits UL feedback packets to control a rate at which DL packets are transmitted prior to a break or reduction in throughput, in accordance with various aspects described.

FIG. 7 illustrates a UE use case in which the UE is going to experience a break or drastic change in throughput during a break interval $T_7$-$T_8$. Breaks in throughput may occur during a handover or connection re-establishment. A drastic change in throughput may be caused by the dropping of a high capacity link. As discussed above, this type of throughput change may cause the transmitter to flood the UE with unnecessary repeated DL packets due to the rapid increase in RTT that will be sensed during the break.

Throughput break predictor circuitry 136 monitors for or receives notifications of conditions that will cause a reduction or break in throughput (e.g., a handover, connection re-establishment, or dropping of one or more carriers for power conservation or other reasons). During a pre-break interval $T_5$-$T_6$ and throughout a break interval $T_7$-$T_8$, the trigger control circuitry 130 triggers the packet throttling circuitry 150 to throttle UL feedback according to a break-related prioritization ratio. The break-related prioritization ratio for UEP1 may be different than a prioritization ratio used in other scenarios. The break-related prioritization ratio may be determined based on a predicted severity of the decrease in bandwidth or length of the break in throughput. The break-related prioritization ratio may change in real-time during the pre-break and/or break intervals in response to changes in measured channel conditions, real-time UE capacity, and so on.

The pre-break interval $T_5$-$T_6$ may be determined to provide time for the throttling to cause the rate of DL packets to be sufficiently reduced in anticipation of the predicted drop in throughput. The length of the throttling interval may be dynamically configured based on the length of the predicted throughput break or a proportion of existing throughput that will be lost. The duration of the break interval $T_7$-$T_8$ may be determined in real-time based on measured channel conditions, real-time UE capacity, and so on. After the break interval (e.g., when channel conditions improve or the UE has sufficiently throttled lower priority traffic to cope with the dropping of a high capacity link), the trigger control circuitry 130 disables the throttling trigger or resumes throttling according to a prioritization ratio that was in use before the throttling interval.

In some examples, after the break interval, the packet throttling circuitry 150 drops buffered UL feedback packets having lowest sequence number and transmits UL feedback packets having the highest sequence number for each application. The UL feedback packets with the highest sequence numbers may serve as an ACK for DL packets with lower sequence numbers.

Figure 8A:
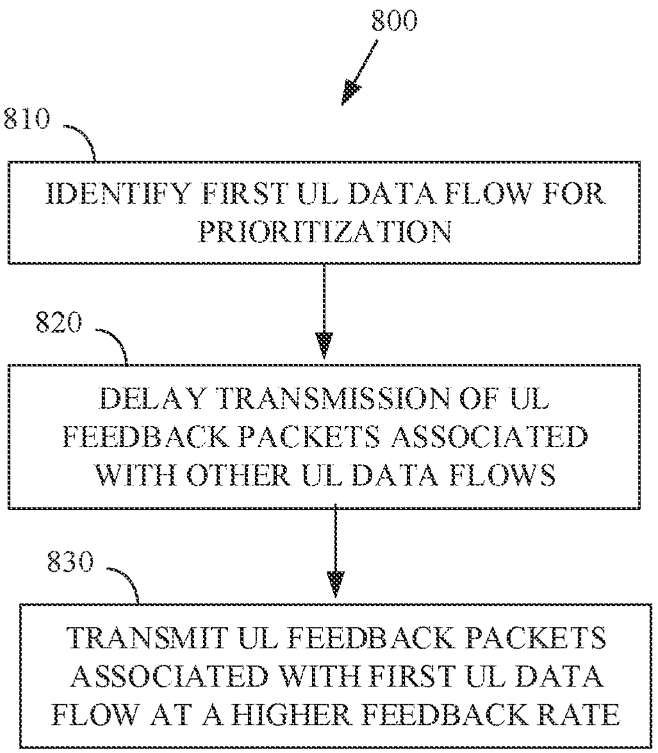
FIGS. 8A and 8B are flow diagrams outlining example methods that may be performed by a UE to control a rate at which DL packets are transmitted, in accordance with various aspects described.

FIG. 8A is a flow diagram outlining an example method 800 that may be performed by a UE or other wireless device to control a rate at which DL packets are transmitted to the UE or other wireless device. The method 800 may be performed by one or more processors of the UE (e.g., 113, 115, or a processor including hardware accelerator 117 of FIG. 1), executing instructions stored in a memory of the UE. The method includes, at 810, identifying a first uplink (UL) data flow for prioritization. In some examples, the first UL data flow is identified based on a metadata tag on UL packets that indicates a priority of a data flow associated with the UL packet.

At 820, transmission of UL feedback packets associated with UL data flows other than the first data flow are delayed to cause the UL feedback packets to be transmitted at a reduced feedback rate. In some examples transmission of the UL feedback packets associated with UL data flows other than the first data flow are delayed by time durations that are based on an amount of additional UL capacity that is desired. At 830, the method includes transmitting UL feedback packets associated with the first UL data flow at a higher feedback rate than the reduced feedback rate.

In some examples, the method includes identifying the first UL data flow based on a metadata tag on UL packets that indicates a priority of a data flow associated with the UL packet; and controlling respective feedback rates of respective UL feedback packets based on the priority indicated by respective metadata tags on the UL feedback packets. The metadata tag (e.g., by way of a header field) may indicate a priority of the application associated with the packet, and, optionally, one or more of an ECN tag, a quality of experience metric of the application such as a mean opinion score, and a QoS performance metric such as delay, throughput, jitter, packet error rate, and so on. The priority indicated by the metadata tag may be an internal priority assigned by the UE with respect to other active applications and may be independent of a priority assigned to the application by the network and used by the queue management function. In some examples, the UEP is indicated by the metadata tag and in other examples, the metadata tag indicates another aspect of the packet (e.g., the originating application or traffic class) and a mapping table of UEP to the indicated aspect is maintained for use in determining a UEP of UL feedback packets. The metadata tag and/or UEP may also be used by the UE for other purposes in addition to DL flow control.

In some examples, one of which is illustrated in FIG. 5, the method includes determining a prioritization ratio that controls a relative feedback rate for the UL feedback packets based on a relative priority of respective data flows associated with the respective UL feedback packets; and transmitting the UL feedback packets according to the prioritization ratio. Examples of this approach are illustrated in FIGS. 3-5. In this manner, UL feedback packets associated with lower UE-assigned priority applications or data flows are transmitted at a lower rate than UL feedback packets associated with the highest UE-assigned priority application or data flow. The prioritization ratio may be dynamically determined based on real-time UE capacity for higher priority UL application traffic packets. In some examples the method includes adjusting the prioritization ratio dynamically in response to available UE UL capacity.

In some examples, the method includes selectively transmitting the UL feedback packets based on a prioritization ratio by delaying transmission of the UL feedback packets associated with different applications or data flows by a time duration that is based on the prioritization ratio and/or ordering UL feedback packets in a transmit queue according to the prioritization ratio such that relative numbers of UL feedback packets for different applications or data flows in the transmit queue are based on the prioritization ratio. In some examples, the method includes determining that a transmit capacity of the UE for a highest priority data flow is below a threshold; and, in response, selectively transmitting the UL feedback packets according to the prioritization ratio.

In some examples, one of which is illustrated in FIG. 6, the method includes determining that the first data flow will include a burst of UL application traffic packets during a burst interval and, during a pre-burst interval occurring before the burst interval, transmitting UL feedback packets according to a burst prioritization ratio.

In some examples, one of which is illustrated in FIG. 7, the method includes determining that a break or reduction in throughput capability of the UE is to occur at a given time and, during a pre-break interval occurring before the given time and during the break or reduction in throughput capability of the UE, transmitting UL feedback packets according to a break prioritization ratio.

Figure 8B:
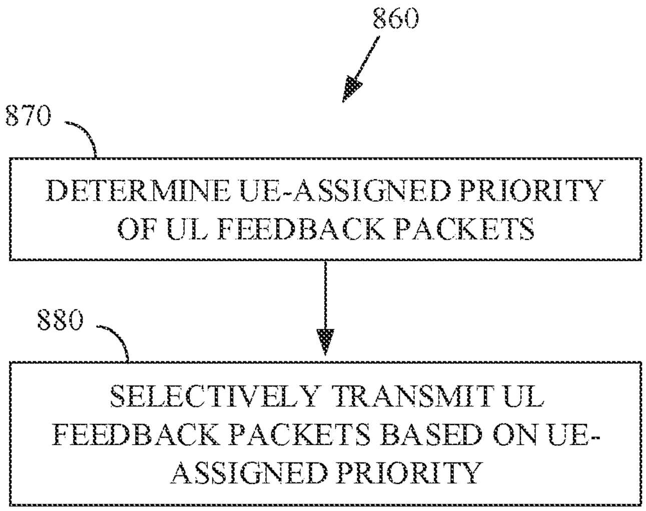

FIG. 8B is a flow diagram outlining an example method 860 that may be performed by a UE or other wireless device to control a rate at which DL packets are transmitted to the UE or other wireless device. The method 860 may be performed by one or more processors of the UE (e.g., 113, 115, or a processor including hardware accelerator 117 of FIG. 1), executing instructions stored in a memory of the UE. The method includes, at 870, determining respective priorities of uplink (UL) feedback packets, which encode acknowledgement (ACK) information or handshaking (HS) information, based on a respective UE-assigned priority of an application with which the respective UL feedback packet is associated.

In some examples, the method includes determining the respective priorities of the UL feedback packets based on a metadata tag on the respective UL feedback packets that indicates a relative UE-assigned priority (UEP) of the application associated with the UL feedback packet. The metadata tag (e.g., by way of a header field) may indicate a priority of the application associated with the packet, and, optionally, one or more of an ECN tag, a quality of experience metric of the application such as a mean opinion score, and a QoS performance metric such as delay, throughput, jitter, packet error rate, and so on. The priority indicated by the metadata tag may be an internal priority assigned by the UE with respect to other active applications and may be independent of a priority assigned to the application by the network and used by the queue management function. In some examples, the UEP is indicated by the metadata tag and in other examples, the metadata tag indicates another aspect of the packet (e.g., the originating application or traffic class) and a mapping table of UEP to the indicated aspect is maintained for use in determining a UEP of UL feedback packets. The metadata tag and/or UEP may also be used by the UE for other purposes in addition to DL flow control. The method includes, at 880, selectively transmitting the respective UL feedback packets based on the respective UE-assigned priorities.

In some examples, the method includes determining a prioritization ratio that controls a relative rate of transmission of the UL feedback packets for different applications and selectively transmitting the UL feedback packets according to the prioritization ratio. Examples of this approach are illustrated in FIGS. 3-5. In this manner, UL feedback packets associated with lower UE-assigned priority applications are transmitted at a lower rate than UL feedback packets associated with the highest UE-assigned priority application. The prioritization ratio may be dynamically determined based on real-time UE capacity for higher priority UL application traffic packets.

In some examples, the method includes selectively transmitting the UL feedback packets based on a prioritization ratio by delaying transmission of the UL feedback packets associated with different applications by a time duration that is based on the prioritization ratio and/or ordering UL feedback packets in a transmit queue according to the prioritization ratio such that relative numbers of UL feedback packets for different applications in the transmit queue are based on the prioritization ratio.

In some examples, such as the example of FIG. 6, the method includes determining that a high UE-assigned priority application will transmit a burst of UL application traffic packets during a burst interval. The method may include predicting bursts based on control signaling associated with UL bursts. During a pre-burst interval occurring before the burst interval, the method includes selectively transmitting the UL feedback packets according to a burst prioritization ratio. In some examples, the method includes selectively transmitting the UL feedback packets according to the burst prioritization ratio during the burst interval as well.

In some examples, the method includes, after the burst interval, discarding buffered UL feedback packets having a lower sequence number (SN) and transmitting UL feedback packets for each application having a highest sequence number.

In some examples, such as the example of FIG. 7, the method includes determining that a break or reduction in throughput capability of the UE is to occur at a given time. The break or reduction in throughput may be predicted based on notifications of conditions that will cause a reduction or break in throughput (e.g., a handover, connection re-establishment, or dropping of one or more carriers for power conservation or other reasons). The method includes, during a pre-break interval occurring before the given time and during a break interval corresponding to the time during which the UE experiences the reduction in throughput, selectively transmit the UL feedback packets according to a break prioritization ratio. The method may include continuing to selectively transmit the UL feedback packets according to the break prioritization ratio until a sufficient increase in throughput capability or UE capacity is detected.

In some examples, the method includes, after the break or reduction in throughput capability of the UE has ceased, discarding buffered UL feedback packets having a lower sequence number (SN) and transmitting UL feedback packets for each application having a highest sequence number.

It can be seen from the foregoing description that the disclosed techniques allow a UE to control different flows of DL packets so that the UE may manage the UE's capacity based on an internal application prioritization without requiring interaction with the network.

Above are several descriptions of flow diagrams outlining example methods and exchanges of messages. In this description and the appended claims, use of the term "determine" with reference to some entity (e.g., parameter, variable, and so on) in describing a method step or function is to be construed broadly. For example, "determine" is to be construed to encompass, for example, receiving and parsing a communication that encodes the entity or a value of an entity. "Determine" should be construed to encompass accessing and reading memory (e.g., lookup table, register, device memory, remote memory, and so on) that stores the entity or value for the entity. "Determine" should be construed to encompass computing or deriving the entity or value of the entity based on other quantities or entities. "Determine" should be construed to encompass any manner of deducing or identifying an entity or value of the entity.

As used herein, the term identify when used with reference to some entity or value of an entity is to be construed broadly as encompassing any manner of determining the entity or value of the entity. For example, the term identify is to be construed to encompass, for example, receiving and parsing a communication that encodes the entity or a value of the entity. The term identify should be construed to encompass accessing and reading memory (e.g., device queue, lookup table, register, device memory, remote memory, and so on) that stores the entity or value for the entity.

As used herein, the term encode when used with reference to some entity or value of an entity is to be construed broadly as encompassing any manner or technique for generating a data sequence or signal that communicates the entity to another component.

As used herein, the term select when used with reference to some entity or value of an entity is to be construed broadly as encompassing any manner of determining the entity or value of the entity from amongst a plurality or range of possible choices. For example, the term select is to be construed to encompass accessing and reading memory (e.g., lookup table, register, device memory, remote memory, and so on) that stores the entities or values for the entity and returning one entity or entity value from amongst those stored. The term select is to be construed as applying one or more constraints or rules to an input set of parameters to determine an appropriate entity or entity value. The term select is to be construed as broadly encompassing any manner of choosing an entity based on one or more parameters or conditions.

As used herein, the term derive when used with reference to some entity or value of an entity is to be construed broadly. "Derive" should be construed to encompass accessing and reading memory (e.g., lookup table, register, device memory, remote memory, and so on) that stores some initial value or foundational values and performing processing and/or logical/mathematical operations on the value or values to generate the derived entity or value for the entity. The term derive should be construed to encompass computing or calculating the entity or value of the entity based on other quantities or entities. The term derive should be construed to encompass any manner of deducing or identifying an entity or value of the entity.

As used herein, the term indicate when used with reference to some entity (e.g., parameter or setting) or value of an entity is to be construed broadly as encompassing any manner of communicating the entity or value of the entity either explicitly or implicitly. For example, bits within a transmitted message may be used to explicitly encode an indicated value or may encode an index or other indicator that is mapped to the indicated value by prior configuration. The absence of a field within a message may implicitly indicate a value of an entity based on prior configuration.

Figure 9:
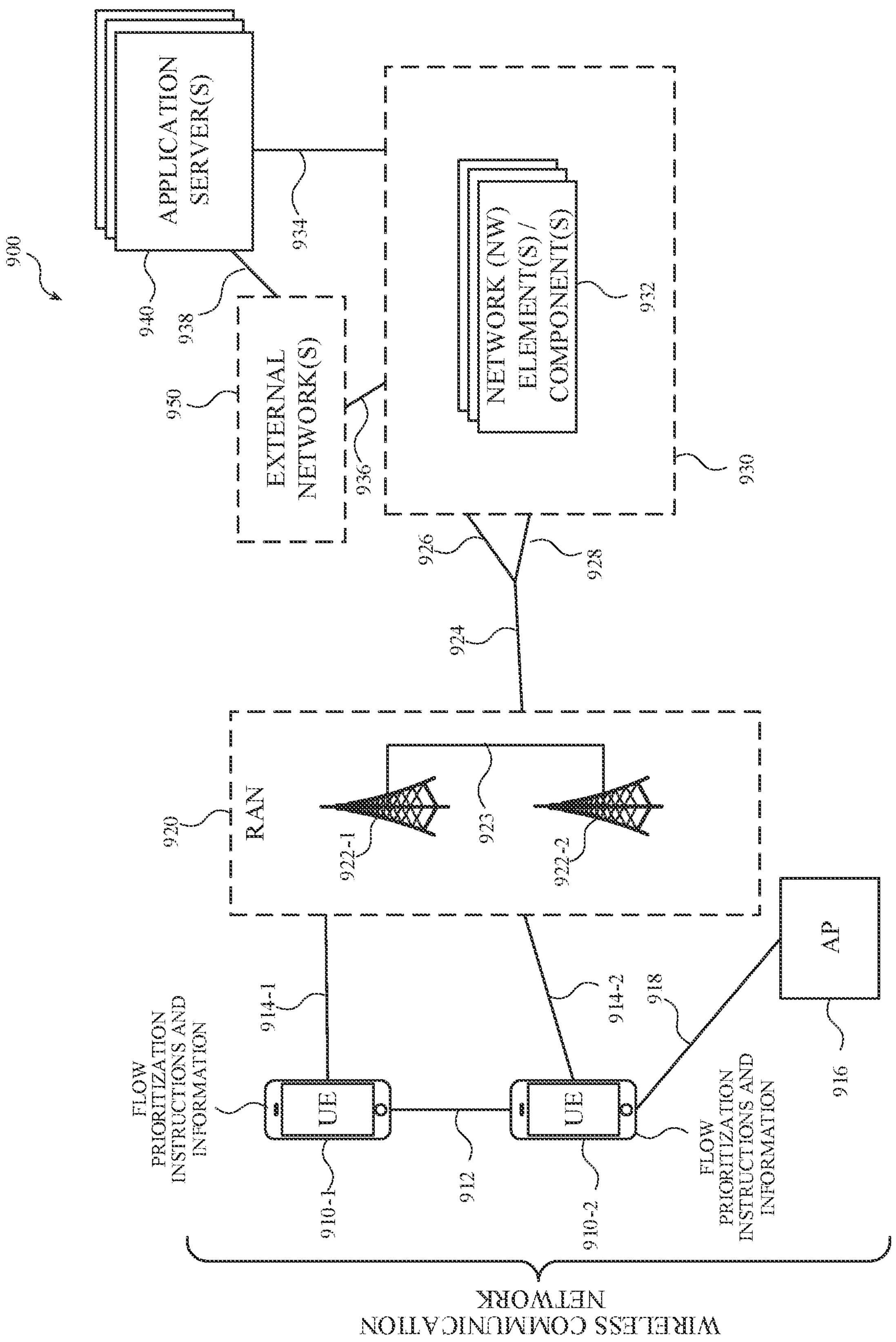
FIG. 9 is a functional block diagram of a wireless communication network, in accordance with various aspects described.

FIG. 9 is an example network 900 according to one or more implementations described herein. Example network 900 may include UEs 910-1, 910-2, etc. (referred to collectively as "UEs 910" and individually as "UE 910"), a radio access network (RAN) 920, a core network (CN) 930, application servers 940, and external networks 950.

The systems and devices of example network 900 may operate in accordance with one or more communication standards, such as 2nd generation (2G), 3rd generation (3G), 4th generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of example network 900 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 910 may include smartphones (e.g., handheld touchscreen mobile computing devices connectable to one or more wireless communication networks). Additionally, or alternatively, UEs 910 may include other types of mobile or non-mobile computing devices capable of wireless communications, such as personal data assistants (PDAs), pagers, laptop computers, desktop computers, wireless handsets, watches etc. In some implementations, UEs 910 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 910 may use one or more wireless channels 912 to communicate with one another. UEs 910 may communicate and establish a connection with (e.g., be communicatively coupled) with RAN 920, which may involve one or more wireless channels 914-1 and 914-2, each of which may comprise a physical communications interface/layer.

As shown, UE 910 may also, or alternatively, connect to access point (AP) 916 via connection interface 918, which may include an air interface enabling UE 910 to communicatively couple with AP 916. AP 916 may comprise a wireless local area network (WLAN), WLAN node, WLAN termination point, etc. The connection 918 may comprise a local wireless connection, such as a connection consistent with any IEEE 702.11 protocol, and AP 916 may comprise a wireless fidelity (Wi-Fi®) router or other AP. While not explicitly depicted in FIG. 9, AP 916 may be connected to another network (e.g., the Internet) without connecting to RAN 920 or CN 930.

RAN 920 may include one or more RAN nodes 922-1 and 922-2 (referred to collectively as RAN nodes 922, and individually as RAN node 922) that enable channels 914-1 and 914-2 to be established between UEs 910 and RAN 920. UE 910-1 and UE 910-2 store flow prioritization instructions for implementing the DL flow control mechanisms disclosed herein to allow UE 910-1 and UE 910-2 to control a rate of DL packets transmitted in channels 914-1 and 914-2, respectively. RAN nodes 922 may include network access points configured to provide radio baseband functions for data and/or voice connectivity between users and the network based on one or more of the communication technologies described herein (e.g., 2G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 922 may include a roadside unit (RSU), a transmission reception point (TRxP or TRP), and one or more other types of ground stations (e.g., terrestrial access points). In some scenarios, RAN node 922 may be a dedicated physical device, such as a macrocell base station, and/or a low power (LP) base station for providing femtocells, picocells or the like having smaller coverage areas, smaller user capacity, or higher bandwidth compared to macrocells. Additionally, or alternatively, one or more of RAN nodes 922 can be next generation eNBs (i.e., gNBs) that can provide evolved universal terrestrial radio access (E-UTRA) user plane and control plane protocol terminations 926, 928 toward UEs 910, and that can be connected to a 5G core network (5GC) 930 via an NG interface 924.

The RAN nodes 922 may be configured to communicate with one another via interface 923. In implementations where the system is an LTE system, interface 923 may be an X2 interface. In NR systems, interface 923 may be an Xn interface. The X2 interface may be defined between two or more RAN nodes 922 (e.g., two or more eNBs/gNBs or a combination thereof) that connect to evolved packet core (EPC) or CN 930, or between two eNBs connecting to an EPC.

As shown, RAN 920 may be connected (e.g., communicatively coupled) to CN 930. CN 930 may comprise a plurality of network elements 932, which are configured to offer various data and telecommunications services to customers/subscribers (e.g., users of UEs 910) who are connected to the CN 930 via the RAN 920. In some implementations, CN 930 may include an evolved packet core (EPC), a 5G CN, and/or one or more additional or alternative types of CNs. The components of the CN 930 may be implemented in one physical node or separate physical nodes including components to read and execute instructions from a machine-readable or computer-readable medium (e.g., a non-transitory machine-readable storage medium).

Figure 10:
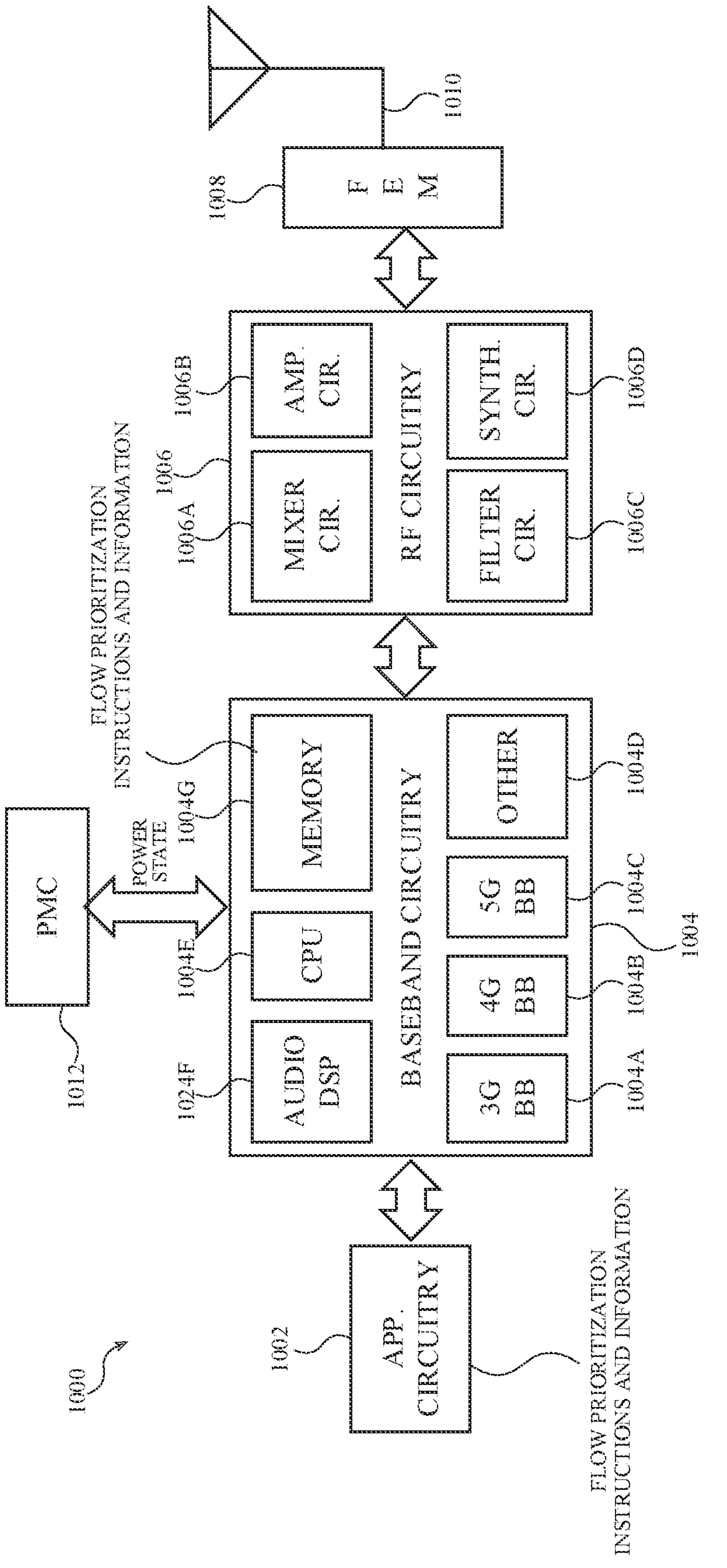
FIG. 10 illustrates a simplified block diagram of a network device, in accordance with various aspects described.

FIG. 10 is a diagram of an example of components of a network device (e.g., a UE of FIGS. 1 and 2) according to one or more implementations described herein. In some implementations, the device 1000 can include application circuitry 1002, baseband circuitry 1004, RF circuitry 1006, front-end module (FEM) circuitry 1008, one or more antennas 1010, and power management circuitry (PMC) 1012 coupled together at least as shown. In some implementations, the device 1000 can include fewer elements. In some implementations, the device 1000 can include additional elements such as, for example, memory/storage, display, camera, sensor (including one or more temperature sensors, such as a single temperature sensor, a plurality of temperature sensors at different locations in device 1000, etc.), or input/output (I/O) interface. In other implementations, the components described below can be included in more than one device (e.g., said circuitries can be separately included in more than one device for Cloud-RAN (C-RAN) implementations).

The application circuitry 1002 can include one or more application processors. For example, the application circuitry 1002 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1000. In some implementations, processors of application circuitry 1002 can process IP data packets received from an EPC. In some implementations, processors or hardware-based accelerators of the application circuitry 1002 may be configured to generate and apply metadata tags indicating UE-assigned priority to UL feedback packets and other UL packets. In some implementations, processors of the application circuitry 1002 may store flow prioritization instructions and information that cause the application circuitry 1002 to perform functions related controlling a rate at which UL feedback packets are transmitted by the device 1000.

The baseband circuitry 1004 can include circuitry such as, but not limited to, one or more single-core or multi-core processors. The baseband circuitry 1004 can include one or more baseband processors or control logic to process baseband signals received from a receive signal path of the RF circuitry 1006 and to generate baseband signals for a transmit signal path of the RF circuitry 1006. Baseband processors may include one or more hardware-based accelerators. Baseband circuitry 1004 can interface with the application circuitry 1002 for generation and processing of the baseband signals and for controlling operations of the RF circuitry 1006. For example, in some implementations, the baseband circuitry 1004 can include a 3G baseband processor 1004A, a 4G baseband processor 1004B, a 5G baseband processor 1004C, or other baseband processor(s) 1004D for other existing generations, generations in development or to be developed in the future (e.g., 5G, 6G, etc.).

The baseband circuitry 1004 (e.g., one or more of baseband processors 1004A-D) can handle various radio control functions that enable communication with one or more radio networks via the RF circuitry 1006. In other implementations, some or all of the functionality of baseband processors

1004A-D can be included in modules stored in the memory 1004G and executed via a Central Processing Unit (CPU) 1004E. In some implementations, the baseband circuitry 1004 can include one or more audio digital signal processor(s) (DSP) 1004F.

In some implementations, processors of the baseband circuitry 1004 may store flow prioritization instructions and information that cause the baseband circuitry 1004 to perform functions related controlling a rate at which UL feedback packets are transmitted by the device 1000.

RF circuitry 1006 can enable communication with wireless networks using modulated electromagnetic radiation through a non-solid medium. In various implementations, the RF circuitry 1006 can include switches, filters, amplifiers, etc. to facilitate the communication with the wireless network. RF circuitry 1006 can include a receive signal path which can include circuitry to down-convert RF signals received from the FEM circuitry 1008 and provide baseband signals to the baseband circuitry 1004. RF circuitry 1006 can also include a transmit signal path which can include circuitry to up-convert baseband signals provided by the baseband circuitry 1004 and provide RF output signals to the FEM circuitry 1008 for transmission.

In some implementations, the receive signal path of the RF circuitry 1006 can include mixer circuitry 1006A, amplifier circuitry 1006B and filter circuitry 1006C. In some implementations, the transmit signal path of the RF circuitry 1006 can include filter circuitry 1006C and mixer circuitry 1006A. RF circuitry 1006 can also include synthesizer circuitry 1006D for synthesizing a frequency for use by the mixer circuitry 1006A of the receive signal path and the transmit signal path.

Examples herein can include subject matter such as a method, means for performing acts or blocks of the method, at least one machine-readable medium including executable instructions that, when performed by a machine or circuitry (e.g., a processor (e.g., processor, etc.) with memory, an application-specific integrated circuit (ASIC), a field programmable gate array (FPGA), or the like) cause the machine to perform acts of the method or of an apparatus or system for DL flow control according to implementations and examples described.

EXAMPLES

Example 1 is a user equipment (UE) including a memory and one or more processors, wherein the one or more processors, when executing instructions stored in the memory, are configured to identify a first uplink (UL) data flow for prioritization; delay transmission of UL feedback packets associated with UL data flows other than the first UL data flow to cause the UL feedback packets to be transmitted at a reduced feedback rate; and transmit UL feedback packets associated with the first UL data flow at a higher feedback rate than the reduced feedback rate.

Example 2 includes the subject matter of example 1, including or omitting optional elements, wherein the one or more processors, when executing instructions stored in the memory, are configured to identify the first UL data flow based on a metadata tag on UL packets that indicates a priority of a data flow associated with the UL packet; and control respective feedback rates of respective UL feedback packets based on the priority indicated by respective metadata tags on the UL feedback packets.

Example 3 includes the subject matter of any one or more of examples 1-2, including or omitting optional elements, wherein the one or more processors, when executing instructions stored in the memory, are configured to determine a prioritization ratio that controls a relative feedback rate for the UL feedback packets based on a relative priority of respective data flows associated with the respective UL feedback packets; and transmit the UL feedback packets according to the prioritization ratio.

Example 4 includes the subject matter of any one or more of examples 1-3, including or omitting optional elements, wherein the one or more processors, when executing instructions stored in the memory, are configured to determine that a transmit capacity of the UE for a highest priority data flow is below a threshold; and in response, selectively transmit the UL feedback packets according to the prioritization ratio.

Example 5 includes the subject matter of any one or more of examples 1-4, including or omitting optional elements, wherein the one or more processors, when executing instructions stored in the memory, are configured to selectively transmit the UL feedback packets based on the prioritization ratio by delaying transmission of the UL feedback packets of different priorities by a time duration that is based on the prioritization ratio; or ordering UL feedback packets of different priorities in a transmit queue according to the prioritization ratio, wherein relative numbers of UL feedback packets of different priorities in the transmit queue are based on the prioritization ratio.

Example 6 includes the subject matter of any one or more of examples 1-5, including or omitting optional elements, wherein the one or more processors, when executing instructions stored in the memory, are configured to determine that the first UL data flow will include a burst of UL application traffic packets during a burst interval; and during a pre-burst interval occurring before the burst interval, transmit UL feedback packets according to a burst prioritization ratio.

Example 7 includes the subject matter of any one or more of examples 1-6, including or omitting optional elements, wherein the one or more processors, when executing instructions stored in the memory, are configured to, after the burst interval, discard buffered UL feedback packets having a lower sequence number (SN) and transmitting UL feedback packets for each application having a highest sequence number.

Example 8 includes the subject matter of any one or more of examples 1-7, including or omitting optional elements, wherein the one or more processors, when executing instructions stored in the memory, are configured to determine that a break or reduction in throughput capability of the UE is to occur at a given time; and during a pre-break interval occurring before the given time and during the break or reduction in throughput capability of the UE, transmit UL feedback packets according to a break prioritization ratio.

Example 9 includes the subject matter of any one or more of examples 1-8, including or omitting optional elements, wherein the one or more processors, when executing instructions stored in the memory, are configured to, after the break or reduction in throughput capability of the UE, discard buffered UL feedback packets having a lower sequence number (SN) and transmitting UL feedback packets for each application having a highest sequence number.

Example 10 includes the subject matter of any one or more of examples 1-9, including or omitting optional elements, wherein the one or more processors, when executing instructions stored in the memory, are configured to adjust the prioritization ratio dynamically in response to available UE UL capacity.

Example 11 includes the subject matter of any one or more of examples 1-10, including or omitting optional elements, wherein the uplink (UL) feedback packets encode acknowledgement (ACK) information or handshaking (HS) information.

Example 12 is a method for a user equipment (UE), including determining respective priorities of uplink (UL) feedback packets based on a respective priority of an application or data flow with which the respective UL feedback packet is associated, wherein the priority is assigned to the application or data flow by the UE; and selectively transmitting the respective UL feedback packets based on the respective priorities.

Example 13 includes the subject matter of example 12, including or omitting optional elements, including determining the respective priorities of the UL feedback packets based on a metadata tag on the respective UL feedback packets that indicates a relative priority of the application associated with the UL feedback packet.

Example 14 includes the subject matter of any one or more of examples 12-13, including or omitting optional elements, including determining a prioritization ratio that controls a relative rate of transmission of the UL feedback packets for different applications; and selectively transmitting the UL feedback packets according to the prioritization ratio, wherein UL feedback packets associated with lower priority applications are transmitted at a lower rate than UL feedback packets associated with a highest priority application.

Example 15 includes the subject matter of any one or more of examples 12-14, including or omitting optional elements, determining that a transmit capacity of the UE for a highest priority application is below a threshold; and in response, selectively transmitting the UL feedback packets according to the prioritization ratio.

Example 16 includes the subject matter of any one or more of examples 12-15, including or omitting optional elements, delaying transmission of the UL feedback packets associated with different applications by a time duration that is based on the prioritization ratio; or ordering UL feedback packets in a transmit queue according to the prioritization ratio, wherein relative numbers of UL feedback packets for different applications in the transmit queue are based on the prioritization ratio.

Example 17 includes the subject matter of any one or more of examples 12-16, including or omitting optional elements, including determining that a high UE-assigned priority application will transmit a burst of UL application traffic packets during a burst interval; and during a pre-burst interval occurring before the burst interval, selectively transmitting the UL feedback packets according to a burst prioritization ratio.

Example 18 includes the subject matter of any one or more of examples 12-17, including or omitting optional elements, including determining that a break or reduction in throughput capability of the UE is to occur at a given time; and during a pre-break interval occurring before the given time and during the break or reduction in throughput capability of the UE, selectively transmitting the UL feedback packets according to a break prioritization ratio.

Example 19 includes the subject matter of any one or more of examples 12-18, including or omitting optional elements, including adjusting the prioritization ratio dynamically in response to available UE UL capacity.

Example 20 is throttling circuitry, configured to determine respective priorities of uplink (UL) feedback packets based on a metadata tag of each UL feedback packet that indicates a UE-assigned priority of an application or data flow with which the UL feedback packet is associated; and selectively transmit the respective UL feedback packets based on respective UE-assigned priorities.

Example 21 includes the subject matter of example 20, including or omitting optional elements, further configured to selectively transmit the UL feedback packets according to a prioritization ratio, wherein UL feedback packets associated with lower UE-assigned priority applications or data flows are transmitted at a lower rate than UL feedback packets associated with a highest UE-assigned priority application or data flow.

Example 22 includes the subject matter of any one or more of examples 20-21, including or omitting optional elements, further configured to delay transmission of the UL feedback packets associated with different applications by a time duration that is based on the prioritization ratio.

Example 23 includes the subject matter of any one or more of examples 20-22, including or omitting optional elements, further configured to order UL feedback packets in a transmit queue according to the prioritization ratio, wherein relative numbers of UL feedback packets for different applications or data flows in the transmit queue are based on the prioritization ratio.

Example 24 is a processor configured to perform functions or operations of any of examples 1-23.

Example 24 is an apparatus including the memory and one or more processors of any of examples 1-11 and 20-23.

Example 25 is a method for a user equipment including performing functions or operations performed by the one or more processors of any of examples 1-11 and 20-23.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases. In some embodiments, the methods illustrated above may be implemented in a computer readable medium using instructions stored in a memory. Many other embodiments and variations are possible within the scope of the claimed disclosure.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A user equipment (UE) comprising a memory and one or more processors, wherein the one or more processors, when executing instructions stored in the memory, are configured to cause the UE to:

assign a UE-assigned priority to a first downlink (DL) data flow and a second DL data flow, wherein the UE-assigned priority of the first DL data flow is higher than the UE-assigned priority of the second DL data flow;

determine, based on the UE-assigned priorities, a reduced feedback rate for transmission of second UL feedback packets associated with the second DL data flow and a higher feedback rate for transmission of first UL feedback packets associated with the first of DL data flow, wherein the first UL feedback packets and the second UL feedback packets comprise acknowledgement of DL data or handshaking-related information requested by a DL packet;

control a rate of transmission of the second UL feedback packets based on the reduced feedback rate; and control a rate of transmission of the first UL feedback packets based on the higher feedback rate.

2. The UE of claim 1, wherein the one or more processors, when executing instructions stored in the memory, are configured to identify the UE-assigned priority of the first DL data flow and the second DL data flow based on a metadata tag on DL packets that indicates a UE-assigned priority of an data flow associated with the DL packet.

3. The UE of claim 1, wherein the one or more processors, when executing instructions stored in the memory, are configured to determine the reduced feedback rate and the higher feedback rate based on a prioritization ratio, wherein the prioritization ratio is based on a relative UE-assigned priority of the first DL data flow and the second DL data flow; and transmit the UL feedback packets according to the prioritization ratio.

4. The UE of claim 3, wherein the one or more processors, when executing instructions stored in the memory, are configured to determine that a transmit capacity of the UE for the first DL data flow is below a threshold; and in response, selectively transmit the first and second UL feedback packets according to the prioritization ratio.

5. The UE of claim 3, wherein the one or more processors, when executing instructions stored in the memory, are configured to determine that a burst of UL application traffic packets will occur during a burst interval; and during a pre-burst interval occurring before the burst interval, transmit the first UL feedback packets and the second UL feedback packets according to a burst prioritization ratio.

6. The UE of claim 5, wherein the one or more processors, when executing instructions stored in the memory, are configured to, after the burst interval, discard buffered first and second UL feedback packets having a lower sequence number (SN) and transmit buffered first and second UL feedback packets having a highest sequence number.

7. The UE of claim 3, wherein the one or more processors, when executing instructions stored in the memory, are configured to determine that a break or reduction in throughput capability of the UE is to occur at a given time; and during a pre-break interval occurring before the given time and during the break or reduction in throughput capability of the UE, transmit the first UL feedback packets and the second UL feedback packets according to a break prioritization ratio.

8. The UE of claim 7, wherein the one or more processors, when executing instructions stored in the memory, are configured to, after the break or reduction in throughput capability of the UE, discard buffered first and second UL feedback packets having a lower sequence number (SN) and transmit buffered first and second UL feedback packets having a highest sequence number.

9. The UE of claim 1, wherein the one or more processors, when executing instructions stored in the memory, are configured to set a delay period between transmissions of the second UL feedback packets by a time duration that is based on the reduced feedback rate; or control relative numbers of the first UL feedback packets and the second UL feedback packets in a transmit queue based on the higher feedback rate and the reduced feedback rate.

10. The UE of claim 1, wherein the one or more processors, when executing instructions stored in the memory, are configured to adjust the reduced feedback rate or the higher feedback rate dynamically in response to available UE UL capacity.

11. A method for a user equipment (UE), comprising:

assigning a first UE-assigned priority to a first downlink (DL) data flow and a second UE-assigned priority to a second application or downlink (DL) data flow;

determining, based on the first and second UE-assigned priorities, a first feedback rate for UL feedback packets associated with the first DL data flow and a second feedback rate for UL feedback packets associated with the second data flow, wherein the UL feedback packets comprise acknowledgement of DL data or handshaking-related information requested by a DL packet; and controlling transmission of the respective UL feedback packets associated with the first or second DL data flows based on the determined respective feedback rates.

12. The method of claim 11, comprising determining the respective feedback rates for the respective UL feedback packets based on a metadata tag on the respective UL feedback packets that indicates the UE-assigned priority of the DL data flow associated with the UL feedback packet.

13. The method of claim 11, comprising:

determining the feedback rates for UL feedback packets based on a prioritization ratio that defines relative feedback rates of UL feedback packets for different DL data flows; and transmitting the UL feedback packets according to the prioritization ratio, wherein UL feedback packets associated with lower UE-assigned priority DL data flows are transmitted at a lower feedback rate than UL feedback packets associated with a highest UE-assigned priority DL data flow.

14. The method of claim 13, comprising:

determining that a transmit capacity of the UE for a highest UE-assigned priority DL data flow is below a threshold; and in response, selectively transmitting the UL feedback packets according to the prioritization ratio.

15. The method of claim 13, comprising:

setting a delay period between transmissions of the UL feedback packets associated with different DL data flows by a time duration that is based on the determined feedback rates; or controlling relative numbers of UL feedback packets for different DL data flows in the transmit queue based on the determined feedback rates.

16. The method of claim 13, comprising:

determining that a high UE-assigned priority application will transmit a burst of UL application traffic packets during a burst interval; and during a pre-burst interval occurring before the burst interval, selectively transmitting the UL feedback packets according to feedback rates determined based on a burst prioritization ratio.

17. The method of claim 13, comprising:

determining that a break or reduction in throughput capability of the UE is to occur at a given time; and during a pre-break interval occurring before the given time and during the break or reduction in throughput capability of the UE, selectively transmitting the UL feedback packets according to feedback rates determined based on a break prioritization ratio.

18. The method of claim 11, comprising adjusting the feedback rates dynamically in response to available UE UL capacity.

19. The method of claim 11, wherein the UE assigned priorities are independent of network assigned priorities for the DL data flows.

20. The method of claim 11, wherein the first UE-assigned priority is a higher priority than the second UE-assigned priority.

21. The method of claim 20, wherein the first feedback rate is a higher rate than the second feedback rate.

22. Throttling circuitry, configured to identify, on each of one or more uplink (UL) feedback packets, a metadata tag that indicates a UE-assigned priority of an downlink (DL) data flow with which the UL feedback packet is associated, wherein the one or more UL feedback packets comprise acknowledgement of DL data or handshaking-related information requested by a DL packet;

determine respective feedback rates for respective UL feedback packets based on respective UE-assigned priorities; and controlling transmission of the respective UL feedback packets based on the respective determined feedback rates.

23. The throttling circuitry of claim 22, further configured to determine the respective feedback rates for the respective UL feedback packets according to a prioritization ratio that defines relative UE-assigned priorities of applications or data flows.

24. The throttling circuitry of claim 22, further configured to set a delay period between transmissions of the UL feedback packets associated with different applications by a time duration that is based on the feedback rates.

25. The throttling circuitry of claim 22, further configured to control relative numbers of UL feedback packets for different applications or data flows in a transmit queue based on the feedback rates.

* * * * *